United States Patent
Larsen et al.

(10) Patent No.: US 9,017,162 B2
(45) Date of Patent: *Apr. 28, 2015

(54) GAMING DEVICE HAVING HARD DRIVE BASED MEDIA AND RELATED METHODS

(71) Applicant: Bally Gaming, Inc., Las Vegas, NV (US)

(72) Inventors: Joshua D. Larsen, Las Vegas, NV (US); Pravinkumar Patel, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/682,655

(22) Filed: Nov. 20, 2012

(65) Prior Publication Data

US 2013/0081011 A1    Mar. 28, 2013

Related U.S. Application Data

(63) Continuation of application No. 12/618,517, filed on Nov. 13, 2009, now Pat. No. 8,317,608.

(51) Int. Cl.
*A63F 9/14*      (2006.01)
*G06F 9/445*    (2006.01)
*G07F 17/32*    (2006.01)

(52) U.S. Cl.
CPC ...... *G06F 8/61* (2013.01); *G07F 17/32* (2013.01); *G07F 17/3202* (2013.01); *G07F 17/323* (2013.01)

(58) Field of Classification Search
USPC ............................................. 463/29; 726/27
See application file for complete search history.

(56) References Cited

U.S. PATENT DOCUMENTS

| | | | |
|---|---|---|---|
| 5,345,550 A * | 9/1994 | Bloomfield | 715/841 |
| 6,564,997 B1 * | 5/2003 | Juds | 235/382 |
| 7,311,601 B2 * | 12/2007 | Anderson et al. | 463/20 |
| 7,515,718 B2 * | 4/2009 | Nguyen et al. | 380/278 |
| 7,520,811 B2 * | 4/2009 | LeMay et al. | 463/29 |
| 8,087,988 B2 * | 1/2012 | Nguyen et al. | 463/17 |
| 2002/0142824 A1 | 10/2002 | Kazaoka et al. | |
| 2007/0050750 A1 | 3/2007 | Bykov et al. | |
| 2008/0064501 A1 | 3/2008 | Patel | |
| 2008/0153588 A1 | 6/2008 | Muir et al. | |
| 2008/0318686 A1 * | 12/2008 | Crowder et al. | 463/42 |
| 2009/0149245 A1 * | 6/2009 | Fabbri | 463/25 |
| 2009/0270302 A1 * | 10/2009 | Blyth et al. | 510/334 |

* cited by examiner

*Primary Examiner* — Christopher Brown
(74) *Attorney, Agent, or Firm* — Brooke W. Quist; Marvin A. Hein; Philip J. Anderson

(57) ABSTRACT

Various embodiments are directed to a gaming device that uses an internal hard drive for primary media storage. The software is installed on the hard drive without requiring physical access to the hard drive including, but not limited to, removal or replacement of the hard drive. According to one method, an install flash program is used to format and/or reformat an internal hard drive. Additionally, the install flash program is used to install media stored on a removable storage device onto the internal hard drive.

19 Claims, 11 Drawing Sheets

GAMING DEVICE HAVING HARD DRIVE BASED MEDIA AND RELATED METHODS

CROSS-REFERENCE TO RELATED APPLICATION

This application is a continuation of U.S. patent application Ser. No. 12/618,517 filed Nov. 13, 2009, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The embodiments disclosed herein are directed to gaming devices using an internal hard drive for primary media storage.

BACKGROUND

Over the years, gaming machines have grown in both sophistication and gaming features to maintain player interest. Gaming machines have gone from relatively simple devices providing a player with an opportunity to win cash awards to sophisticated, multi-media devices. Even more, the games presented on the gaming machines have become increasing intricate. For example, slot-style games may include five or more reels with twenty or more paylines. Furthermore, games may include one or more bonus games or different game modes that allow a player to participate in a community game or a tournament. Accordingly, with the increasing complexity of these games, there is a continuing need for gaming machines to have the capabilities to support these games.

SUMMARY

Briefly, and in general terms, various embodiments are directed to a gaming device using an internal hard drive for primary media storage. The software is installed on the hard drive without requiring physical access to the hard drive including, but not limited to, removal or replacement of the hard drive. Various methods may be used to install the software onto the hard drive of a gaming device.

One method for installing content onto an internal hard drive of a gaming device includes: detecting whether a removable media is present on the gaming device, wherein the removable media includes one or more programs; ascertaining whether the one or more programs on the removable media are supported by the gaming device; installing the one or more programs; reading part numbers and a version of Jurisdiction EEPROM, BIOS, and one or more removable media; and displaying the part numbers and version of Jurisdiction EEPROM, BIOS, and one or more removable media.

Another method for installing one or more software programs onto an internal hard drive of a gaming device includes: initializing the gaming device; clearing NVRAM and EEPROM of the gaming device; detecting whether a removable media is present on the gaming device, wherein the removable media includes software; presenting installation options, wherein the installation options include options to install one or more software programs, remove one or more software programs, test hardware, or reformat the internal hard drive; installing a software program onto the internal hard drive from the removable media in response to operator input; reading part numbers and a version of Jurisdiction EEPROM, BIOS, and one or more removable media; and displaying the part numbers and version of Jurisdiction EEPROM, BIOS, and one or more removable media.

Yet another method for installing software onto an internal hard drive of a gaming device includes: providing the gaming device with a first compact flash; determining whether a second compact flash is present on the gaming device; presenting an option to format or reformat the internal hard drive when the second compact flash is not present on the gaming device; installing media from the second compact flash onto the internal hard drive, wherein the internal hard drive is a primary storage device for media; reading part numbers and a version of Jurisdiction EEPROM, BIOS, and one or more removable media; and displaying the part numbers and a version of Jurisdiction EEPROM, BIOS, and one or more removable media.

Another method for installing one or more game onto an internal hard drive of a gaming device includes: presenting installation options, wherein the installation options include an option to access one or more games from a remote host; obtaining the one or more games in response to selection of an installation option; installing the one or more games onto the internal hard drive; reading part numbers and a version of Jurisdiction EEPROM, BIOS, and one or more removable media; and displaying the part numbers and version of Jurisdiction EEPROM, BIOS, and one or more removable media.

Other features and advantages will become apparent from the following detailed description, taken in conjunction with the accompanying drawings, which illustrate by way of example, the features of the various embodiments.

DETAILED DESCRIPTION

Various embodiments are directed to a gaming device that uses an internal hard drive for primary media storage. The software is installed on the hard drive without requiring physical access to the hard drive including, but not limited to, removal or replacement of the hard drive. According to one method, an install flash program is used to format and/or reformat an internal hard drive. Additionally, the install flash program is used to install media stored on a removable storage device onto the internal hard drive. The install flash program generally is a stand alone program that only requires operator interaction at the gaming device and does not require any connection to a server or any download from a host system.

In one embodiment, the install flash program is booted from a compact flash. In other embodiments, the install flash program is booted from removable media such as, but not limited to, a USB drive or optical disk. In yet another embodiment, the hard drive may be removed from the gaming device and loaded with software via an external machine or computer. In another embodiment, a portable download host is connected to the gaming device in order to install software onto the hard drive of the gaming device. By way of example, but not of limitation, the portable download host may be a laptop computer running on a G2S server.

Figure 1:
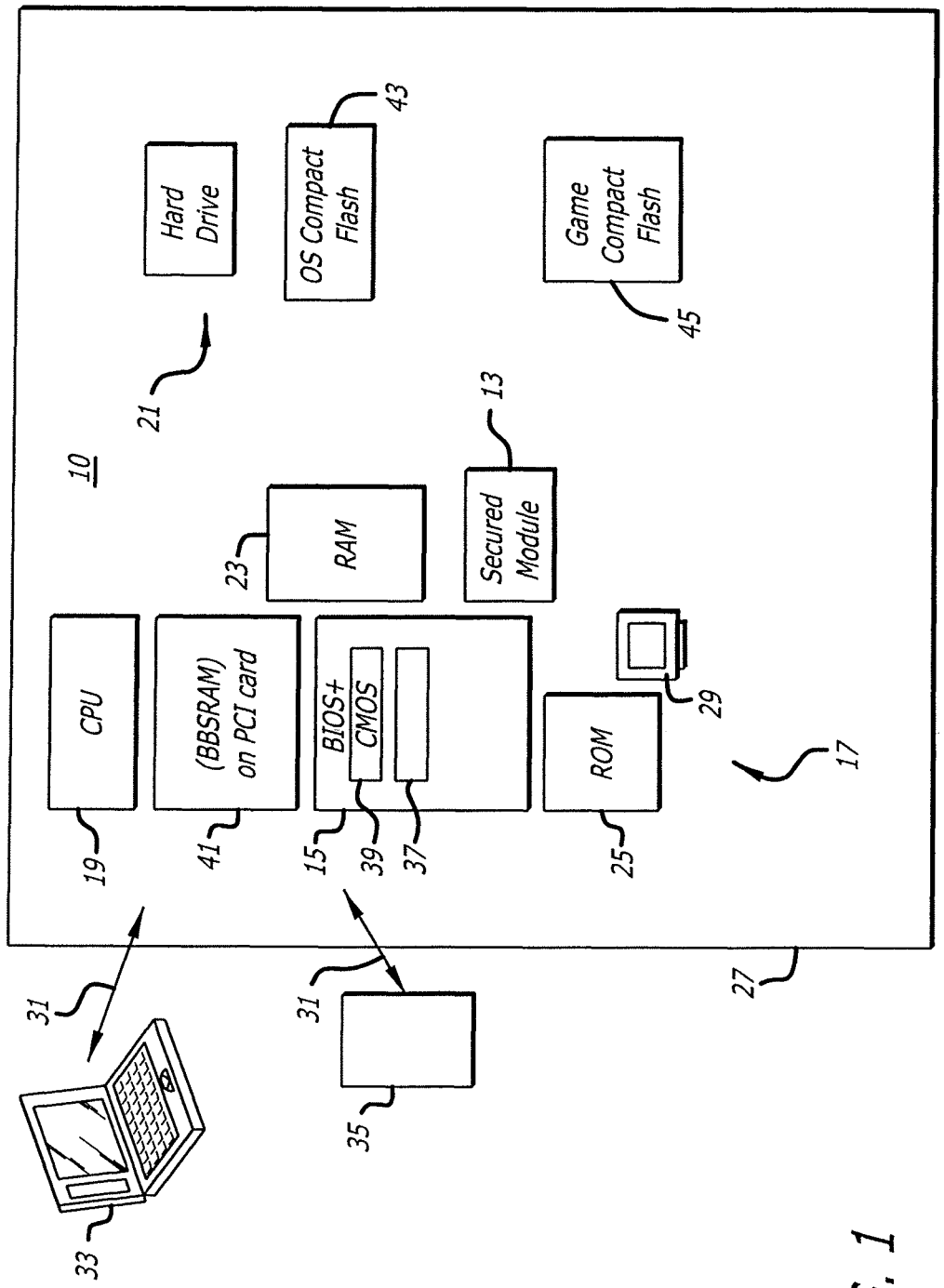
FIG. 1 illustrates a block diagram of the components of a gaming device.

Referring now to the drawings, wherein like reference numerals denote like or corresponding parts throughout the drawings and, more particularly to FIGS. 1-17, there are shown various embodiments of a gaming device having an internal hard drive as a primary source of media storage. More specifically, FIG. 1 illustrates the components 17 of one embodiment of a gaming device 10. The components 17 comprise, for example, and not by way of limitation, software or data file components, firmware components, hardware components, or structural components of the gaming machine 10. These components include, without limitation, one or more processors 19, a hard disk device 21, volatile storage media, such as random access memories (RAMs) 23, read-only memories (ROMs) 25 or electrically-erasable programmable ROMs (EEPROMS), such as basic input/output systems (BIOS) 15. Additionally, the gaming device 10 includes a secured module 13. The secured module is a hardware component that is one-time programmable. One or more security algorithms may be provided on the secured module. The security algorithm generates a challenge (e.g., generates a random number), calculates an expected response to the challenge, and determines the validity of the BIOS based on the response to the challenge provided by the BIOS. In one embodiment, the secured module is a field-programmable gate array (FPGA). In another embodiment, the secured module is a trusted platform module (TPM).

In one embodiment, components 17 also include data files (which are any collections of data, including executable programs in binary or script form, and the information those programs operate upon, gaming machine cabinets (housings) 27, displays 29, or compact disk read-only memory (CD-ROM) or CD read-write (CD-RW) storage. In one embodiment, the data files may include data storage files, software program files, operating system files, and file allocation tables or structures. Ports 31 are to be included with the gaming machine 10 for connection to diagnostic systems 33 and other input/output devices 35. In one embodiment, the ports 31 each comprise a serial port, universal serial bus (USB) port, parallel port or any other type of known port, including a wireless port. Preferably, each of the components 17 have embedded or loaded in them identification numbers or strings that can be accessed by the processor 19, including the processor 19 itself, which are utilized for authentication as explained below. In one embodiment, the components that are data files each use their file path and name as their identification number or string.

Either within the gaming machine 10, or in the diagnostic system 33 attachable to the gaming machine 10, are executable instructions or a software program 37 for authentication of the components (authentication software 37), which itself may be one of the components 17 to authenticate, if it is internal to the gaming machine 10. In one embodiment, authentication software 37 is stored on a persistent storage media such as the hard disk device 21, ROM 25, EEPROM, in a complementary metal oxide semiconductor memory (CMOS) 39, in safe RAM comprising a battery-backed static random access memory (BBSRAM) 41, in one or more flash memory components 43, 45, or other type of persistent memory. In one embodiment, the authentication software 37 is stored in a basic input/output system (BIOS) 15 device or chip. BIOS chips 15 have been used for storing prior authentication software, such as previous versions of the BIOS+ chip used by Bally Gaming Systems, Inc. of Las Vegas, Nev. in their EVO gaming system. Placing the authentication software 37 in the BIOS 15 is advantageous because the code in the BIOS 15 is usually the first code executed upon boot or start-up of the gaming machine 10, making it hard to bypass the authentication process. Alternatively, in one embodiment, the authentication software 37 is stored in a firmware hub (FWH), such as Intel's 82802 FWH.

As an alternative, instead of, or in conjunction with, the hard disk device 21, another mass storage device is used, such as a CD-ROM, CD-RW device, a WORM device, a floppy disk device, a removable type of hard disk device, a ZIP disk device, a JAZZ disk device, a DVD device, a removable flash memory device, a hard card type of hard disk device, or a solid state memory device.

It should be noted that the term, "gaming device" is intended to encompass any type of gaming machine, including handheld devices used as gaming machines such as cellular-based devices (e.g. phones), PDAs, or the like. The gaming device can be represented by any network node that can implement a game and is not limited to cabinet based machines. The system has equal applicability to gaming machines implemented as part of video gaming consoles, handheld, or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally-compliant gaming, ensuring the location of play and the identity of the player. In another embodiment, the casino provides an entire personal computing device with these devices built in, such as a tablet type computing device, PDA, cell phone or other type of computing device capable of playing system games.

Figure 2:
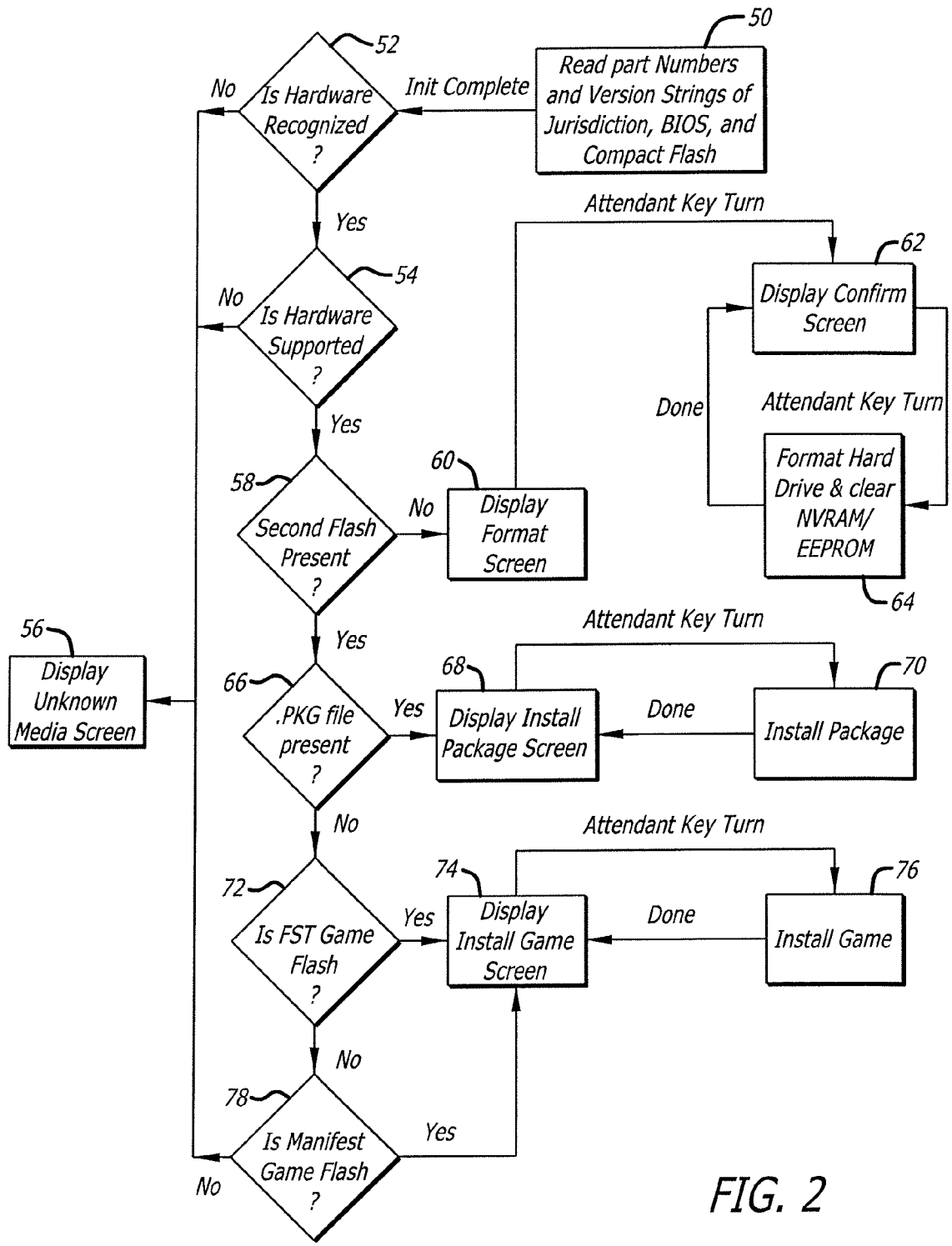
FIG. 2 is a flow diagram of one method for installing content onto a hard drive based media.

FIG. 2 illustrates one method for installing content onto a hard drive. At step 50, the part numbers, version, and jurisdiction of the BIOS, compact flash, and jurisdictional EEPROM are read at initialization. In one embodiment, a copy of the input/output (I/O) library used with the operating system (OS) is used to read the jurisdiction chip and the part number is read from the install compact flash. In one embodiment, the following information is presented on a display of the gaming device: the Install Flash part number, the Jurisdiction name, the Jurisdiction part number, the BIOS name, and the BIOS part number. By displaying the jurisdiction, the operator is able to verify the jurisdiction before proceeding with the installation or other initialization processes. In the event that the jurisdiction chip cannot be read, the display will show an "Unable to read Jurisdiction" message in place of the jurisdiction name and part number. The failure to read the jurisdiction chip will not prevent the clear flash program to clear the NVRAM or EEPROM.

In another embodiment, the following information is presented on a display of the gaming device: the Install Flash part number, the Jurisdiction name, the Jurisdiction part number, instructions to turn an attendant key to perform a task, or the status of the task being performed. Optionally, the different display screens may have different colored backgrounds to differentiate the screens. In another embodiment, the background color may change as a task is being processed.

At step 52, the install flash program determines whether any hardware (e.g., a second compact flash) is present in the second compact flash slot of the gaming device. If there is no compact flash present or the compact flash contains unsupported media, an "unknown media" screen is displayed on one or more video displays of the gaming device at step 56. If the attendant key is turned when the "unknown media" is displayed, no action is taken.

If the hardware is present, the program determines whether the hardware is supported at step 54. Supported items include, but are not limited to, a game flash with a file signature table, a game flash with manifest files, or a package. If the I/O library fails to initialize due to a hardware mismatch or other detectable error, the display screen presents the relevant error instead of instructions to turn the attendant key.

Figure 3:
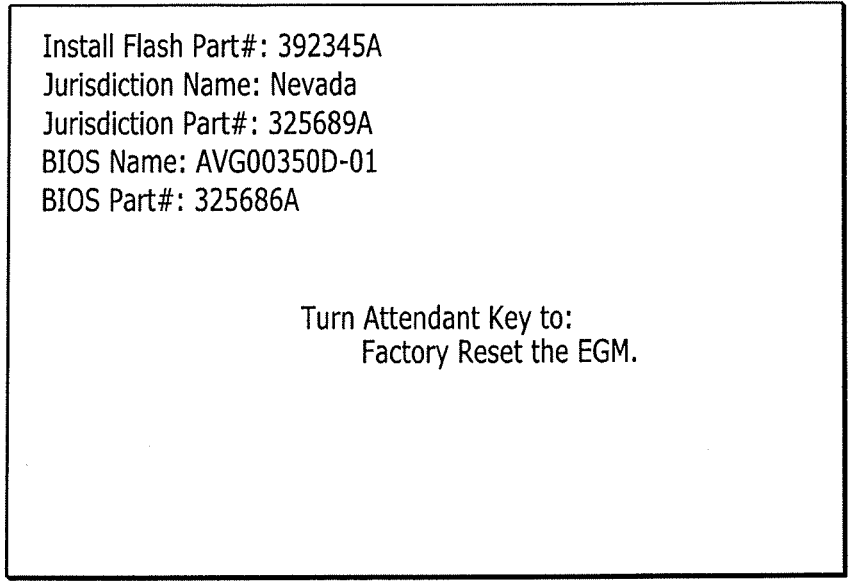
FIG. 3 is a screen shot of one embodiment of a format screen for a gaming device.
Figure 3:
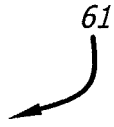

If a second compact flash is not present, a "format screen" 61 is presented on a video display of the gaming device at step 60. In one embodiment, as shown in FIG. 3, the "format screen" page 61 presents the following information: the Install Flash part number, the Jurisdiction name, the Jurisdiction part number, instructions to turn an attendant key to "factory reset the gaming device," which may include, but is not limited to, formatting or reformatting the hard drive, clearing the NVRAM, clearing the EEPROM, or any combination thereof. In another embodiment, the "format screen" 61 may be provided with a colored background (e.g., red background) to differentiate the "format screen" 61 from other display screens. This is a safety measure to prevent accidental formatting or reformatting of the hard drive.

Figure 4:
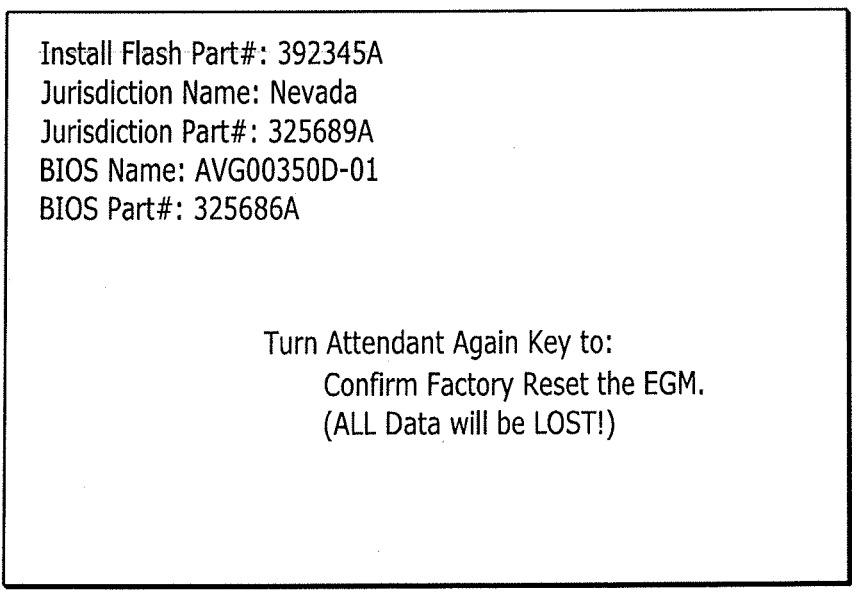
FIG. 4 is a screen shot of one embodiment of a confirmation screen for a gaming device.
Figure 4:
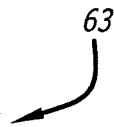

Once the attendant key is turned, a "confirmation" screen 63 is presented on the video display, as shown in FIG. 4. This page is presented to prevent accidental hard drive reformatting. The confirmation screen 63 presents similar information as the format screen. In one embodiment, the confirmation screen 63 has a different colored background (e.g., green) than the format screen (e.g., red). Once the attendant key is turned, the hard drive is formatted at step 64. As part of the formatting, the NVRAM and EEPROM are also cleared.

Figure 5:
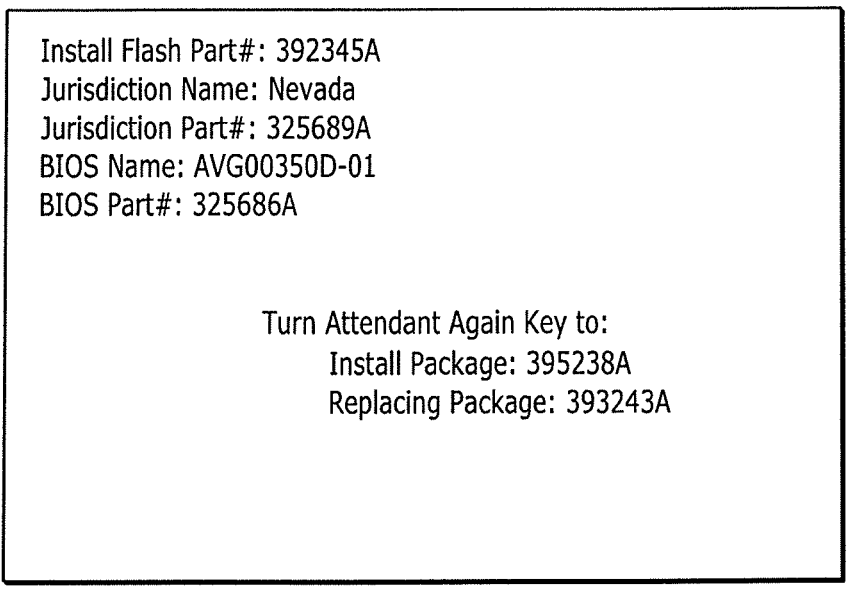
FIG. 5 is a screen shot of one embodiment of an install package screen for a gaming device.

If a second flash is present in the second compact flash slot, the install flash program then determines whether the second flash includes a .pkg file at step 66. If a .pkg file is present, the package details are presented on an "install package" screen 67 at step 68. When the attendant key is turned, the package is installed on the hard drive at step 70. In one method, the NVRAM and the EEPROM are also cleared as part of the installation process. The package file may also replace an already installed package file, as shown in FIG. 5.

Figure 6:
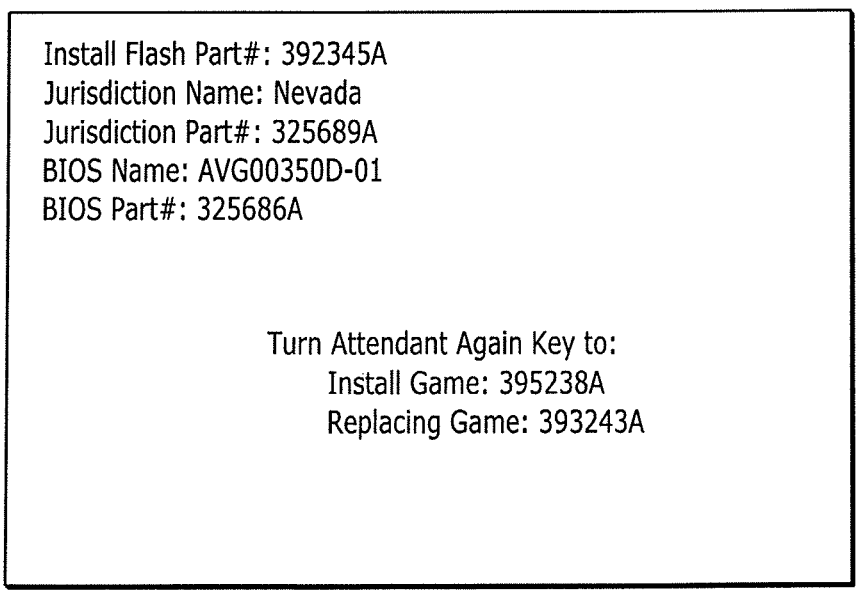
FIG. 6 is a screen shot of one embodiment of an install game screen for a gaming device.

At step 72, the install flash program determines whether the second compact flash is a FST Game flash. If yes, the "install game" screen 73 is presented on a display of the gaming device, as shown in FIG. 6. The "install game" screen 73 presents information on the raw, signed, game image contained on the second compact flash. When the attendant key is turned, the game image is downloaded from the second compact flash into an image file on the hard drive. In one embodiment, the install flash program only supports one game image at one time so installing a new game image will replace the previous game image. In another embodiment, the install flash program may support more than one game image so that more than one game image may be installed on the hard drive.

Figure 7:
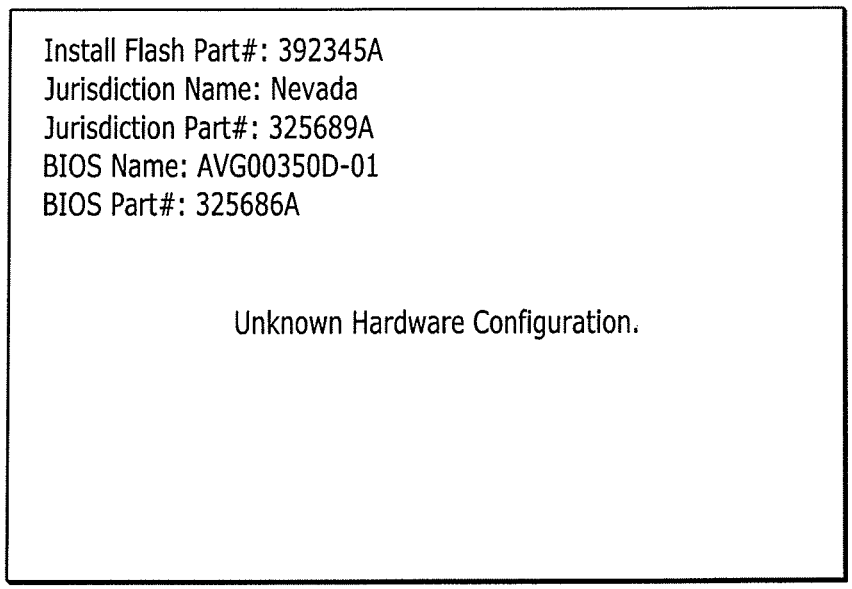
FIG. 7 is a screen shot of one embodiment of an error screen for a gaming device.

At step 78, the install flash program determines whether the second compact flash is a Manifest Game flash. If not, an unknown media screen 55 (as shown in FIG. 7) is presented on the display at step 56. Otherwise, the "install game" screen is displayed at step 74. When the attendant key is turned, the game image is downloaded from the second compact flash into an image file on the hard drive.

Figure 8:
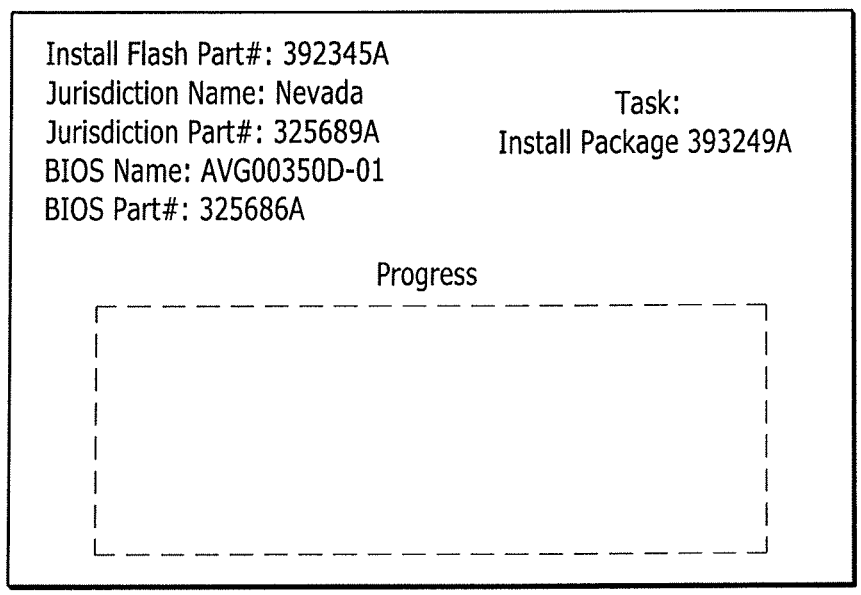
FIG. 8 is a screen shot of one embodiment of a task progress screen for a gaming device.

According to one method, a "task progress" screen 79, as shown in FIG. 8, may be displayed as a particular task is being carried out. For example, the "task progress" screen 79 is displayed when the hard drive is being reformatted or formatted in step 64, a package is being installed in step 70, or a game is being installed in step 76. The specific task that is in progress may also be displayed on the screen. When the "task progress" screen is displayed, the gaming device will not respond to any attendant key movement.

Figure 9:
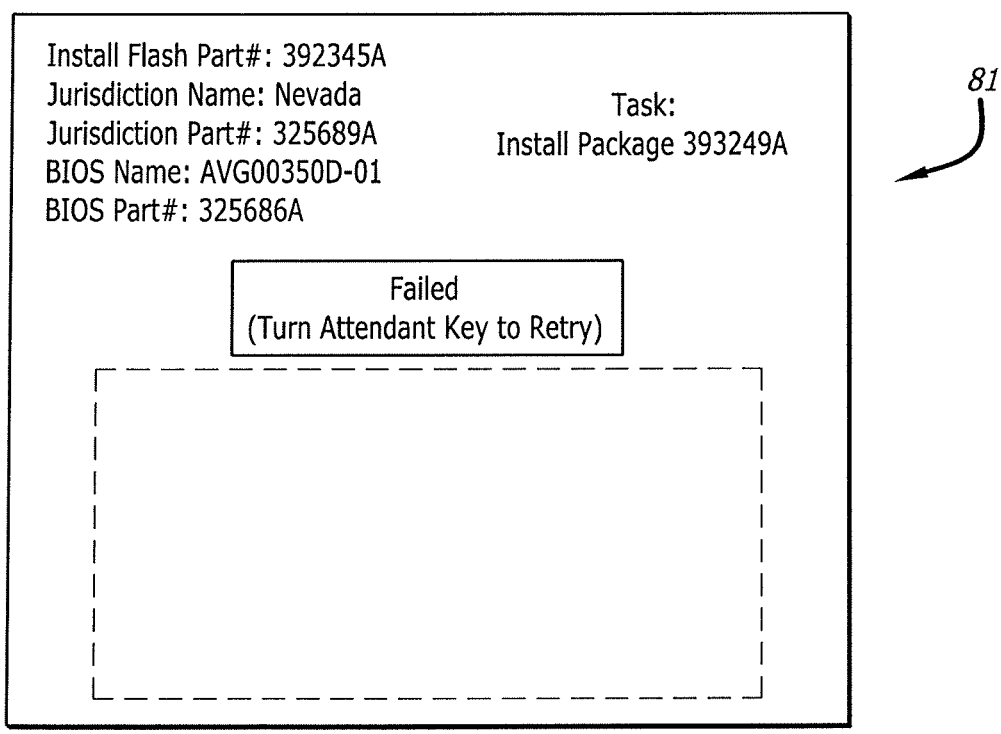
FIG. 9 is a screen shot of one embodiment of a task error screen for a gaming device.

In the event that a requested task fails to complete, an error message may be presented on the "task progress" screen. FIG. 9 illustrates one embodiment of a task error page 81. The operator may attempt to try again by turning the attendant key. In one embodiment, there is no success or fail feedback from the task script to the install process, so the ability to repeat the task is present.

In the screen shots shown in FIGS. 3-6 and 9, the operator confirms an action by turning an attendant key. In other embodiments, an action may be confirmed by an operator by pushing a button (electromechanical or touchscreen), entering a confirmation information such as, but not limited to, a personal identification number, biometric information, a confirmation number, or any other forms of input known or developed in the art.

In another method, a clear flash program may be run prior to executing the install flash method shown in FIG. 2, in which the clear flash program clears the flash executables. The clear flash program may be a program separate from the install flash program or a component of the install flash program. The clear flash includes files to be booted by the kernel in the BIOS. During initialization of the clear flash program, the jurisdiction chip is read using a copy of the I/O library from the OS, and the part number is read from the compact flash. In one embodiment, the Jurisdiction part number, Jurisdiction name, and BIOS part number are presented on a display. In another embodiment, the following information is presented on a display of the gaming device: the clear flash version and part number; Jurisdiction name and part number; BIOS version and part number; instructions to turn an attendant key to clear NVRAM and EEPROM; the status of a job during clear process; or any combination thereof. In the event that the clear flash program cannot read the Jurisdiction chip, an error is displayed in lieu of the instructions to turn the attendant key. In one embodiment, the failure to read the Jurisdiction chip will not prevent the clear flash program form being used to clear the NVRAM and the EEPROM.

After a turn of the attendant key is detected, the clear flash program zeros out the entire NVRAM data storage and reads it back to verify that all zeros were successfully written. After the NVRAM is cleared, the clear flash program clears the EEPROM in the same manner. The clear flash program also removes all the files in the Critical Data partition and the Scratch partition of the hard drive. Once completed, the clear flash program returns to a state in which the success or failure of the clear flash process is displayed. In one method, the display screen is updated with the step description and the progress of the step.

In the event that the I/O library fails to initialize due to a hardware mismatch or other similar detectable error, an error message is presented on a display screen instead of instructions to turn the attendant key. If an I/O error is detected, the clear flash program will not attempt to clear the NVRAM or the EEPROM even if the attendant key is later turned. An error message will also be displayed if the NVRAM or EEPROM fail to clear. For example, if a read back verification error or other I/O error occurs during the process of clearing the NVRAM or EEPROM, an error message is displayed when the executable returns to a display state.

In other methods, an authentication process may be run prior to the install flash process. The authentication process may have different levels of authentication. According to one method, there is no authentication. Rather, the software is installed on the hard drive and relies on boot time authentication. In another method, partial authentication occurs. According to the partial authentication method, a portion of the media is authenticated such as, but not limited to, the pre-partition of older games, manifest files of newer games, or the package headers of installation package. In yet another method, full authentication is carried out. According to the full authentication method, the entire media to be installed is authenticated prior to installation. Alternatively, authentication may occur while installation occurs.

In the clear flash and install flash methodologies discussed above, the display screens present information in ASCII in order to reduce boot time by eliminating the need to load and control graphical data. However, in other embodiments, the display screens may employ graphical data. In one embodiment, a graphical touch screen interface may be employed. Additionally, in one embodiment, the installation media is a compact flash. In other embodiments, the installation media may be other removable data storage types such as, but not limited to, USB hard drives, optical drives, or solid state memory devices.

Figure 10:
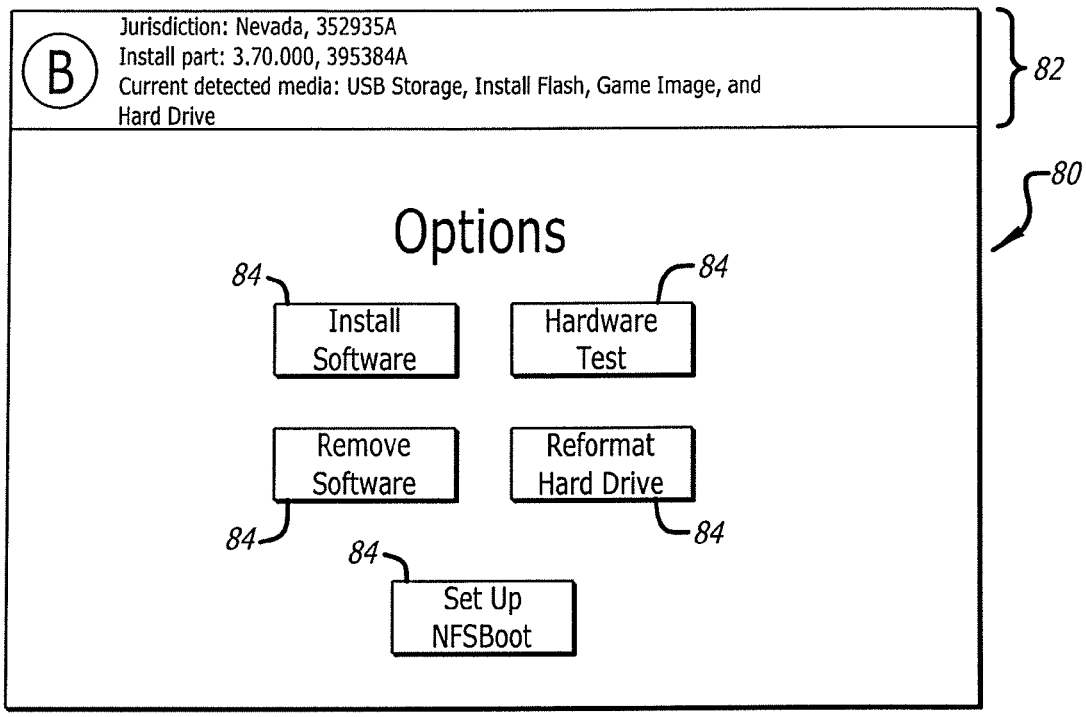
FIG. 10 is a screen shot of one embodiment of a setup page for a gaming device.

FIG. 10 illustrates a screen shot of one embodiment of a graphical menu 80 for the install flash program. As shown in FIG. 10, the header 82 includes the Jurisdiction name, the install part number, and the media currently detected. The current detected media allows the operator to ascertain whether the installation media to be used in the installation process has been detected. As shown in FIG. 10, the install flash program provides graphical buttons 84 having the following options: install software, remove software, reformat hard drive, hardware test, and Set Up NFS (Network Mounted File System) Boot. The Set Up NFS Boot option is only presented on the menu 80 if the installed BIOS is a diagnostic BIOS.

Figure 11:
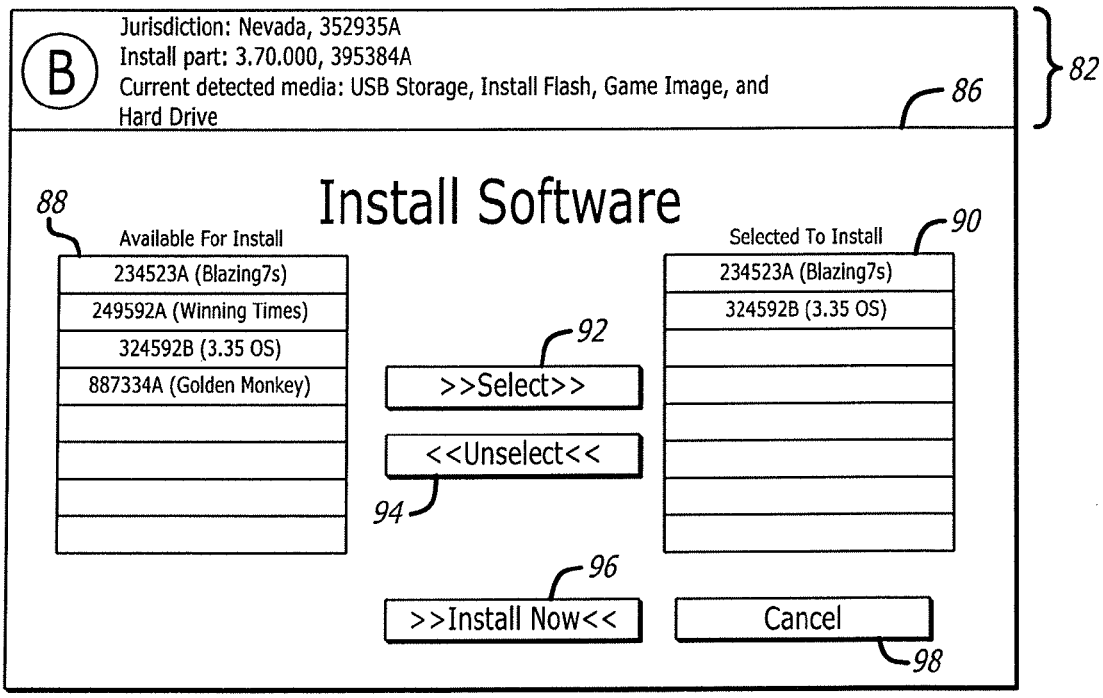
FIG. 11 is a screen shot of one embodiment of a software installation page for a gaming device.

FIG. 11 illustrates a screen shot of one embodiment of a software installation menu 86, which allows an operator to select and install software. The installation menu includes a list of programs available for installation 88 and a list of programs selected for installation 90. The menu 86 also includes graphical buttons for selecting 92, unselecting 94, installing 96 and cancelling 98 software installation. Additionally, the software installation menu 86 also includes a header information 82 that lists the Jurisdiction name, Jurisdiction part number, install flash part number, install flash version, and current detected media.

As shown in FIG. 11, software selected for installation is highlighted 98 and is also presented in the selected for installation list 90 when the select button 92 is actuated. To remove software from the installation list 90, the operator selects the software and touches the unselect button 94. Once the operator has chosen the software to be installed, the operator selects the "install now" button 96 which will begin the installation process. To abort, the operator may select the "cancel" button 98 at any time to return to the previous menu.

In this embodiment, multiple games may be installed at once, and the installation of a new game does not automatically uninstall a previously stored game. When the installation of a game causes existing software to be uninstalled, a pop-up confirmation window is displayed, thereby allowing the operator to confirm the un-installation of previous software.

Figure 12:
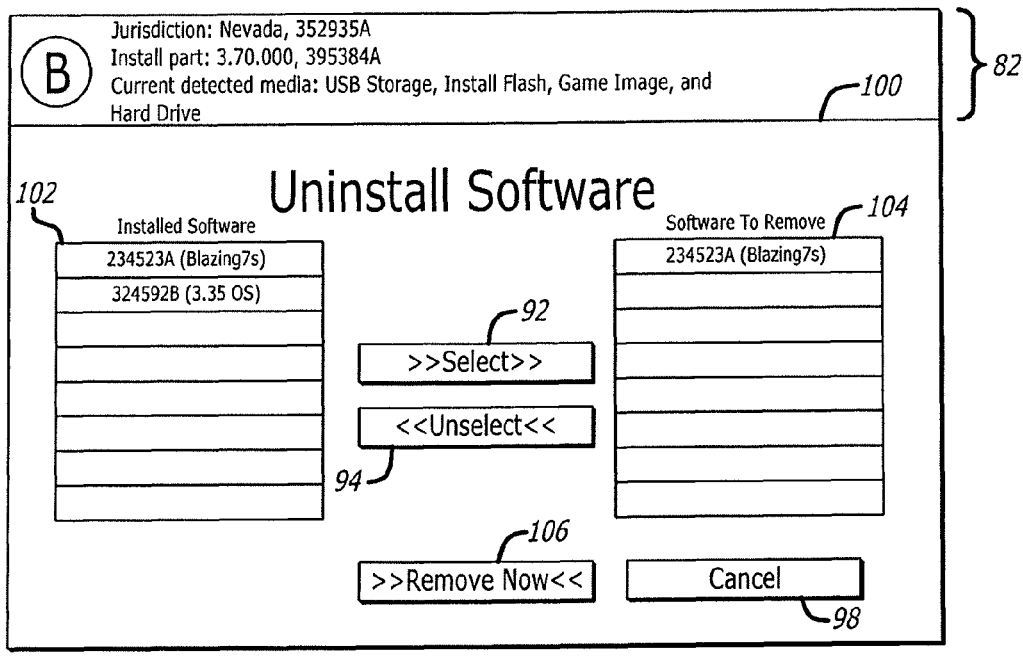
FIG. 12 is a screen shot of one embodiment of an uninstall software page for a gaming device.

FIG. 12 is a screen shot of one embodiment of an uninstall software menu 100. The uninstall menu is generally similar to the install software menu 86 except the uninstall menu includes a list of installed software 102, a list of software to be removed 104, and a remove software button 106.

Figure 13:
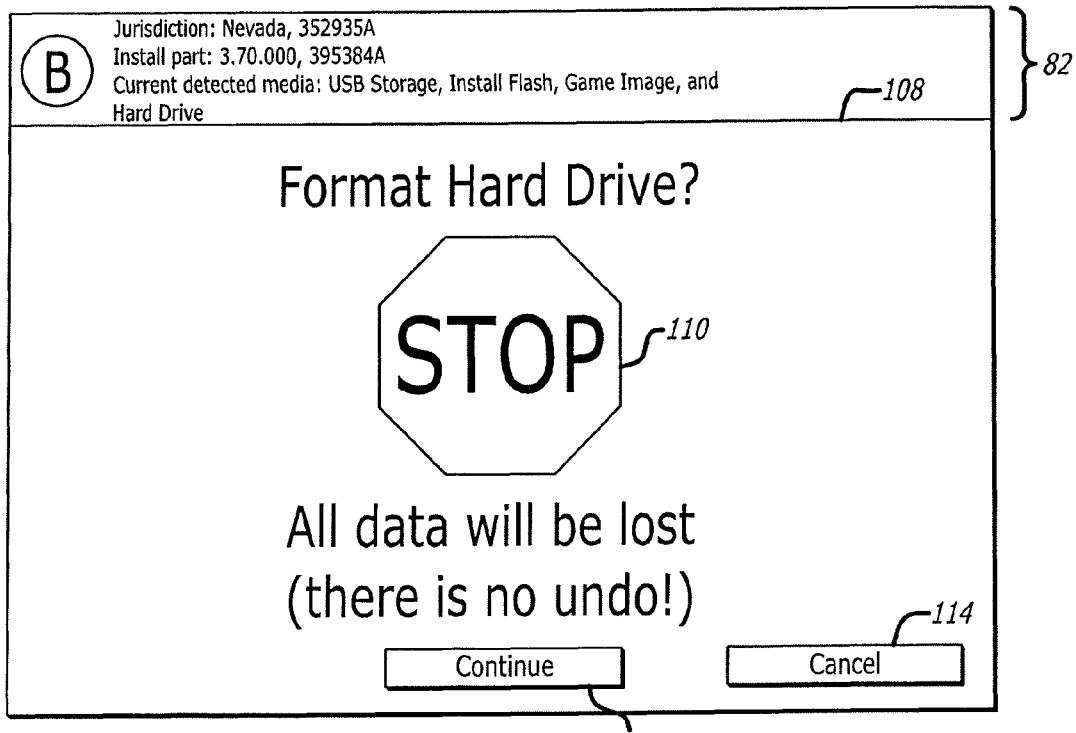
FIG. 13 is a screen shot of one embodiment of a format hard drive page for a gaming device.

FIG. 13 is a screen shot of one embodiment of a reformat hard drive menu 108. The format hard drive screen is presented to the operator in order to prevent accidental formatting and/or reformatting. A stop sign 110 and/or other indicia or message(s) may be presented to alert the operator that continuing forward will be irreversible. The menu 108 also provides a "continue" button 112 for initiating a format and/or reformat of the hard drive, and a "cancel" button 114 for aborting any reformatting. In one embodiment, the "continue" button 112 is not initially displayed on the reformat hard drive menu 108. The "continue" button 112 may be missing for the first five (5) seconds that the operator is in the reformat hard drive menu. As those skilled in the art will appreciate, any delay in presenting the "continue" button 112 is contemplated. The delay in presenting the "continue" button 112 prevents accidental actuation of the continue button due to an accidental double tap of a button from a previous screen.

Figure 14:
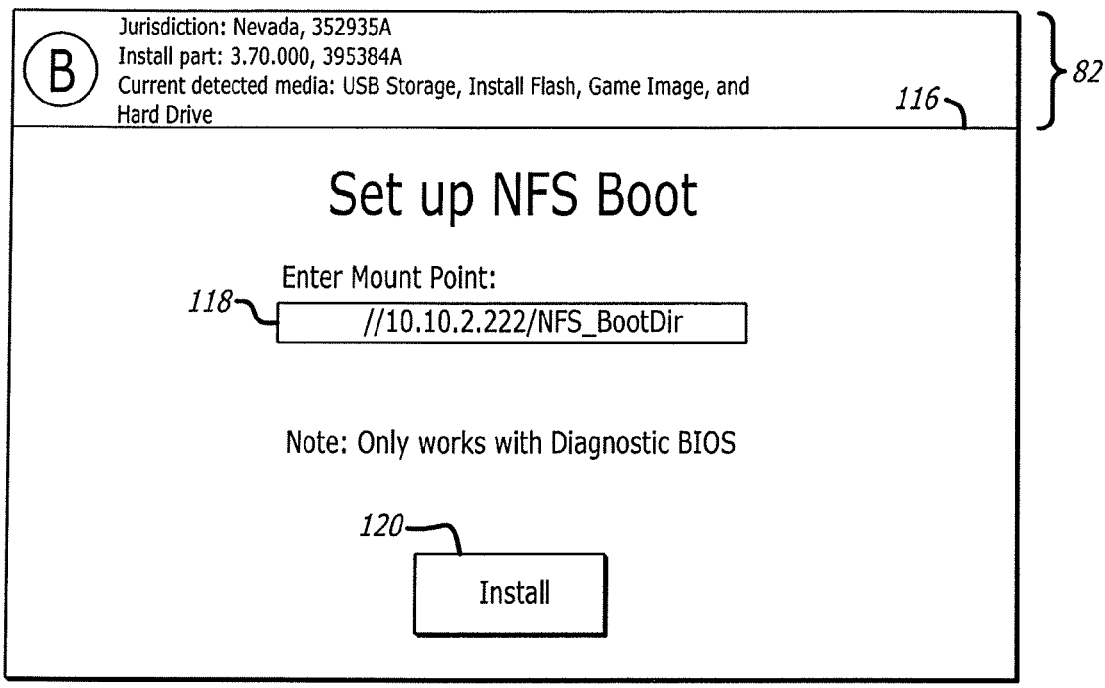
FIG. 14 is a screen shot of another embodiment of a setup page for a gaming device.

FIG. 14 is a screen shot of one embodiment of a Set Up NFS Boot menu 116. Generally, this menu 116 is a developmental tool. The NFS Boot menu includes a mount point field 118 and an install button 120. If a diagnostic BIOS is present, a manufacturer establishes a NFS boot through this menu 116. This process overrides the OS installation with a NFS Boot installation. The NFS Boot installation replaces any previous OS installation. Accordingly, switching away from NFS will require installing a new BIOS. As shown in FIG. 14, a mount point field 118 is stored in a read/write portion of the hard drive. As a security measure, the BIOS is checked on every boot of the NFS system to ensure that the NFS only runs with a diagnostic BIOS.

In another embodiment, the install flash program allows programs and data to be downloaded to the hard drive of a gaming machine from a server through a connection secured by SSL certificates or other communication security technology known or developed in the art. By way of example, but not of limitation, the shared network drive may be used to create a secure connection between a server and a gaming machine. Like the NFS Boot, the mounted media may be used during the boot-up process. Optionally, the mounted media is also copied locally so that future boot-ups may load from the local hard drive rather than loading the media through the network. Each time the gaming device boots with this configuration, the mounted media is accessed and checked for new or changed content.

In yet another embodiment, the install flash program includes an operator menu-driven download. The download menu triggers the download process and retrieves packages from a remote host located in a back room server or remote file server outside of the gaming establishment. In one embodiment, the operator menu also logs the download and authorizes the user. In one embodiment, the download-related logs may be stored on the local hard drive. The download menu may include a challenge and response system, biometrics, or other systems for identifying and authenticating an operator.

Figure 15:
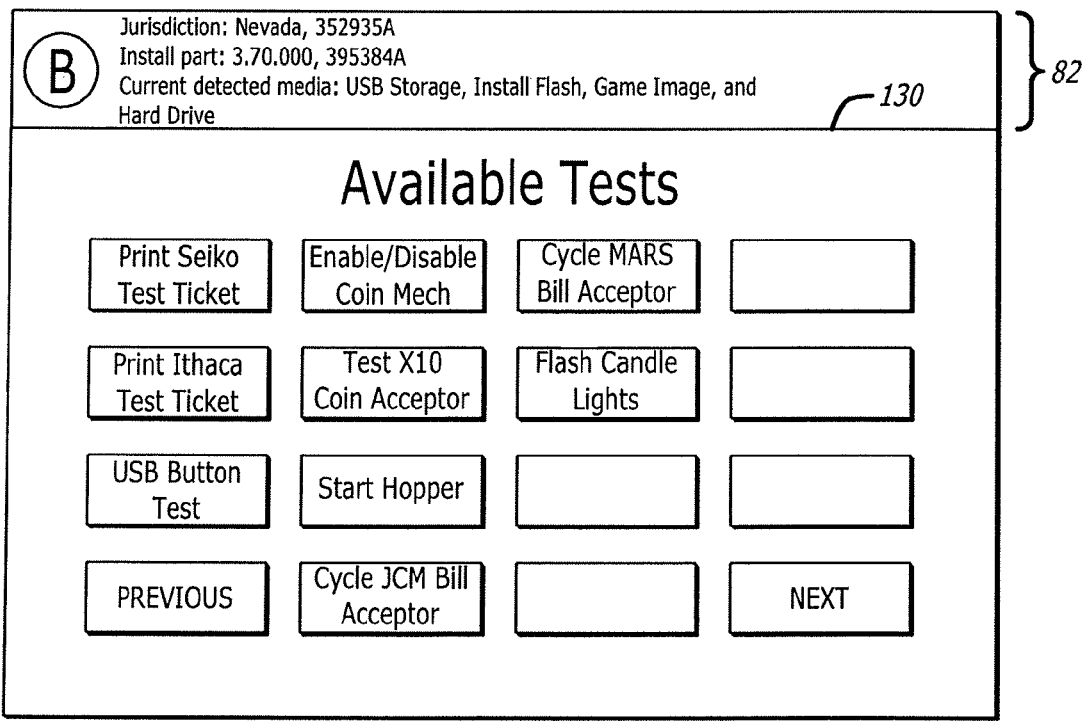
FIG. 15 is a screen shot of one embodiment of a hardware test menu for a gaming device.

FIG. 15 illustrates one embodiment of a hardware test menu 130 that provides features for allowing field technicians and manufacturing workers to test a gaming device for hardware problems. Each button on the screen performs or starts the named test on the button. In one embodiment, the test is immediately performed once a button is pushed. In other embodiments, activating a button opens a submenu related to the selected button. Optionally, the menu 130 includes "next" and "previous" buttons for allowing an operator to navigate one or more panes of buttons. In another embodiment, the install flash program includes a manufacturing floor installation feature that facilitates the software selection process for a gaming device. This feature allows the appropriate software to be downloaded from a server to the gaming machine by entering the gaming machine's serial number.

In the screen shots shown in FIGS. 10-15, the operator may confirm an action by turning an attendant key, pushing one or more electromechanical or touchscreen buttons (e.g., test button). In other embodiments, the operator may enter confirmation information to confirm an action. The conformation information includes, but is not limited to, a personal identification number, biometric information, a confirmation number, or any other forms of input known or developed in the art.

Figure 16:
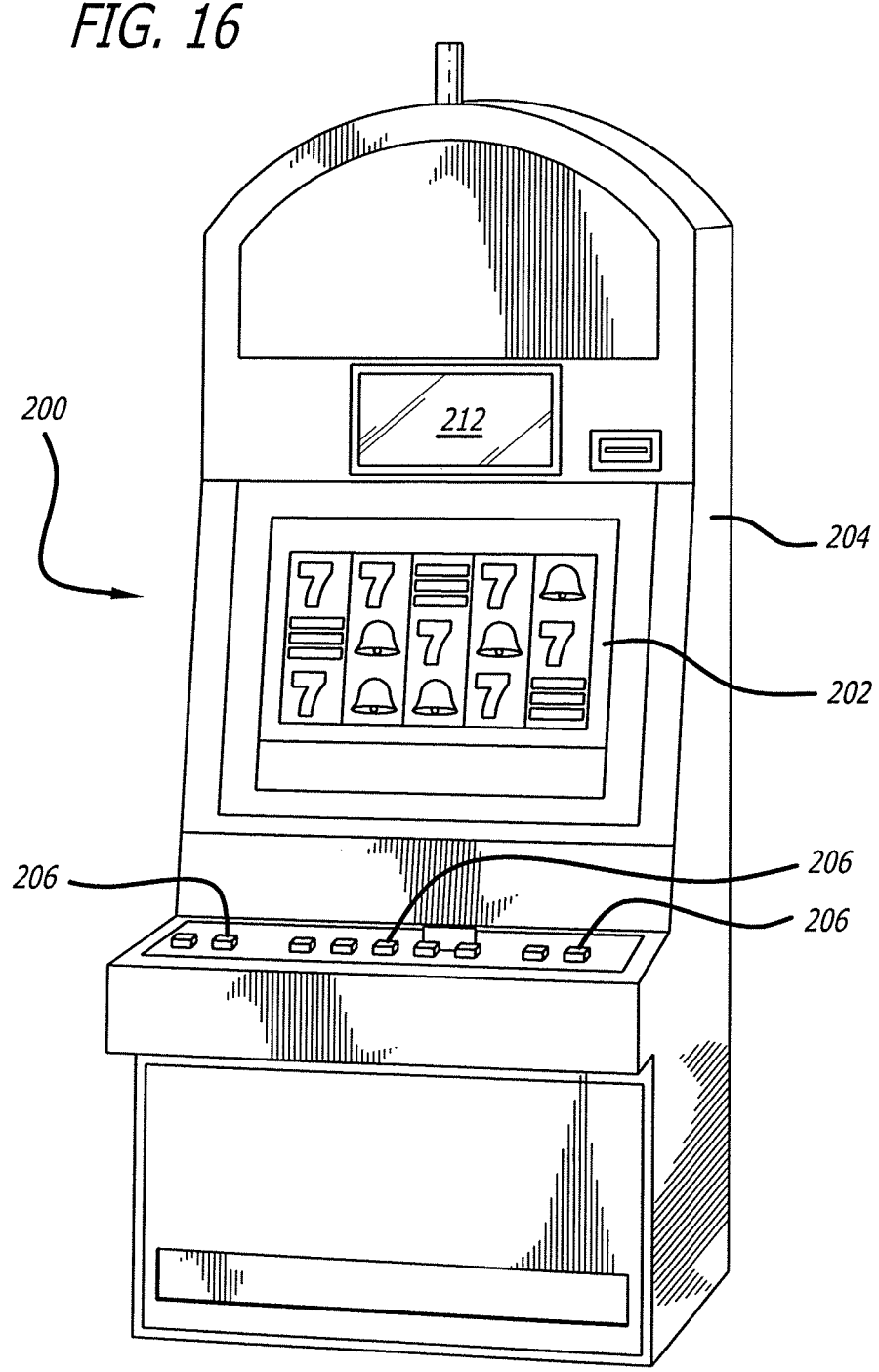
FIG. 16 illustrates one embodiment of a gaming device including the hard drive for primary media storage.

FIG. 16 illustrates one embodiment of a gaming device including an internal hard drive used as primary storage for media. In FIG. 16, the main cabinet 204 of the gaming machine 200 is a self-standing unit that is generally rectangular in shape. In another embodiment, the main cabinet 204 may be a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 200 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIG. 16, the gaming machine 200 includes a main display 202. According to one embodiment, the main display 202 is a plurality of mechanical reels for presenting a slot-style game. Alternatively, the main display 202 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 202 is a widescreen display (e.g., 16:9 or 16:10 aspect ratio display). In one embodiment, the display 202 is a flat-panel display including by way of example only, and not by way of limitation, liquid crystal, plasma, electroluminescent, vacuum fluorescent, field emission, LCOS (liquid crystal on silicon), and SXRD (Silicon Xtal Reflective Display), or any other type of panel display known or developed in the art. These flat-panel displays may use panel technologies to provide digital quality images including by way of example only, and not by way of limitation, EDTV, HDTV, or DLP (Digital Light Processing).

According to one embodiment, the widescreen display 202 may be mounted in the gaming cabinet 204 in a portrait or landscape orientation. In another embodiment, the game display 202 may also include a touch screen or touch glass system (not shown). The touch screen system allows a player to input choices without using any electromechanical buttons 206. Alternatively, the touch screen system may be a supplement to the electromechanical buttons 206.

The main cabinet 204 of the gaming machine also houses a game management unit (not shown) that includes a CPU, circuitry, and software for receiving signals from the player-activated buttons 206 and a handle (not shown), operating the games, and transmitting signals to the respective game display 206 and speakers (not shown). Additionally, the gaming machine includes an operating system such as Bally Gaming's Alpha operating system (OS), as disclosed in U.S. Pat. No. 7,278,068, which is hereby incorporated by reference.

In various embodiments, game programs may be stored in a memory (not shown) comprising a read-only memory (ROM), volatile or non-volatile random access memory (RAM), a hard drive or flash memory device or any of several alternative types of single or multiple memory devices or structures.

As shown in FIG. 16, the gaming machine 200 includes a plurality of player-activated buttons 206. These buttons 206 may be used for various functions such as, but not limited to, selecting a wager denomination, selecting a number of games to be played, selecting the wager amount per game, initiating a game, or cashing out money from the gaming machine 200. The buttons 206 function as input mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated by reference. Additionally, other input devices, such as but not limited to, touch pad, track ball, mouse, switches, and toggle switches, are included with the gaming machine to also accept player input. Optionally, a handle (not shown) may be "pulled" by a player to initiate a slots-based game.

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

In some embodiments, the gaming machine 200 is part of a gaming system connected to or with other gaming machines as well as other components such as, but not limited to, a Systems Management Server (SMS) and a loyalty club system (e.g., casino management personnel/system (CMP/CMS)). Typically, the CMP/CMS system performs casino player tracking and collects regular casino floor and player activity data. The gaming system may communicate and/or transfer data between or from the gaming machines 200 and other components (e.g., servers, databases, verification/authentication systems, and/or third-party systems).

Figure 17:
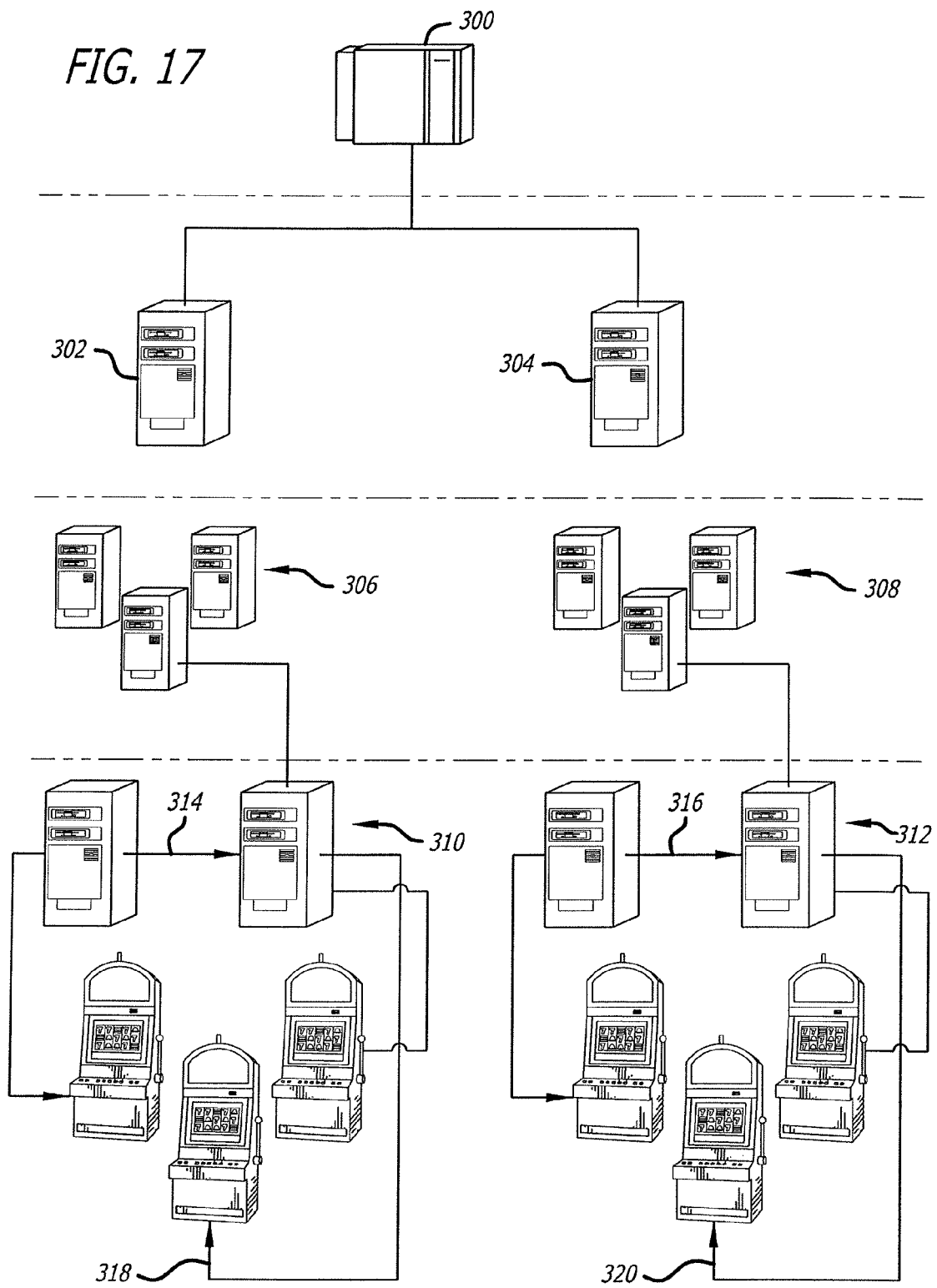
FIG. 17 illustrates one embodiment of a gaming system network including the gaming devices of FIG. 16.

An embodiment of a network that may be used with the gaming device is illustrated in FIG. 17. The example network consists of a top-level, vender distribution point 300 that contains all packages for all jurisdictions; one or more Jurisdiction distribution points 302 and 304 that contain regulator approved production signed packages used within that jurisdiction or sub-jurisdiction; one or more Software Management Points 306 and 308 to schedule and control the downloading of packages to the gaming machine; and a one or more Software Distribution Points 310 and 312 that contain regulator-approved, production-signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 310 or 312 or from the gaming servers.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for installing content onto an internal hard drive of a gaming device, the method comprising:
   detecting whether a removable media is present on the gaming device, wherein the removable media includes one or more programs;
   ascertaining whether the one or more programs on the removable media are supported by the gaming device;
   installing, in response to an attendant key being turned at the gaming device, the one or more programs onto the internal hard drive from the removable media; and
   presenting a completed installation message after the one or more programs are successfully installed.

2. The method of claim 1, further comprising displaying progress of the installation of one or more programs.

3. The method of claim 1, further comprising:
   presenting an option to format the internal hard drive when no removable media is present on a gaming device; and
   formatting the internal hard drive.

4. The method of claim 1, further comprising authenticating the one or more programs on the removable media after detecting the removable media.

5. The method of claim 1, further comprising clearing NVRAM and EEPROM prior to detecting presence of the removable media.

6. The method of claim 1, further comprising-presenting instructions on a display, wherein the instructions prompt an operator to turn an attendant key to install the one or more programs.

7. A method for installing one or more software programs onto an internal hard drive of a gaming device, the method comprising:
   initializing the gaming device;
   clearing NVRAM and EEPROM of the gaming device;
   detecting whether a removable media is present on the gaming device, wherein the removable media includes software;
   presenting installation options, wherein the installation options include options to install one or more software programs, remove one or more software programs, test hardware, or reformat the internal hard drive; and
   installing, in response to an attendant key being turned at the gaming device, a software program out of the one of more software programs onto the internal hard drive from the removable media.

8. The method of claim 7, further comprising authenticating the software program on the removable media.

9. The method of claim 7, wherein the software programs comprise a plurality of games.

10. A method for installing software onto an internal hard drive of a gaming device, the method comprising:
    providing the gaming device with a first compact flash;
    determining whether a second compact flash is present on the gaming device;
    presenting an option to format or reformat the internal hard drive; and
    installing, in response to an attendant key being turned at the gaming device, media from the second compact flash onto the internal hard drive, wherein the internal hard drive is a primary storage device for media.

11. The method of claim 10, further comprising ascertaining whether the media on the second compact flash is supported by the gaming device.

12. The method of claim 10, wherein presenting the option to format or reformat the internal hard drive further comprises prompting installation of the media from the second compact flash onto the internal hard drive.

13. The method of claim 10, further comprising authenticating the media installed on the internal hard drive.

14. The method of claim 10, wherein the media is game software.

15. A method for installing one or more game onto an internal hard drive of a gaming device, the method comprising:
    presenting installation options, wherein the installation options include an option to access one or more games from a remote host;
    obtaining the one or more games in response to selection of an installation option;
    installing, in response to an attendant key being turned at the gaming device, the one or more games onto the internal hard drive;
    presenting a completed installation message after the one or more programs are successfully installed in response to an attendant key being turned at the gaming device.

16. The method of claim 15, wherein obtaining the one or more games comprises downloading the game from the remote host.

17. The method of claim 15, further comprising:
   authorizing an operator; and
   logging a download transaction on the internal hard drive.

18. The method of claim 15, wherein obtaining the one or more games comprises:
   establishing a connection between the gaming device and a remote server; and
   running the game from the remote server.

19. The method of claim 18, wherein the connection is a secure connection.

\* \* \* \* \*